US012529519B2

(12) United States Patent
Morikoshi

(10) Patent No.: US 12,529,519 B2
(45) Date of Patent: Jan. 20, 2026

(54) CONTAINER, FLUID HANDLING DEVICE, AND FREEZE-DRYING METHOD

(71) Applicant: Enplas Corporation, Saitama (JP)

(72) Inventor: Daisuke Morikoshi, Saitama (JP)

(73) Assignee: Enplas Corporation, Saitama (JP)

(*) Notice: Subject to any disclaimer, the term of this patent is extended or adjusted under 35 U.S.C. 154(b) by 428 days.

(21) Appl. No.: 17/994,067

(22) Filed: Nov. 25, 2022

(65) Prior Publication Data

US 2023/0168033 A1 Jun. 1, 2023

(30) Foreign Application Priority Data

Nov. 29, 2021 (JP) ................................ 2021-193100

(51) Int. Cl.

*F26B 5/06* (2006.01)
*B01L 3/00* (2006.01)
*F26B 25/18* (2006.01)

(52) U.S. Cl.

CPC ................ *F26B 5/06* (2013.01); *B01L 3/523* (2013.01); *F26B 25/185* (2013.01); *B01L 2200/04* (2013.01); *B01L 2200/0684* (2013.01)

(58) Field of Classification Search

CPC .......... F26B 5/06; F26B 25/185; B01L 3/523; B01L 2200/04; B01L 2200/0684
USPC ...................................................... 34/284, 92
See application file for complete search history.

(56) References Cited

U.S. PATENT DOCUMENTS

| | | | | | |
|---|---|---|---|---|---|
| 5,334,162 | A * | 8/1994 | Harris | A61J 1/2096 604/416 |
| 5,487,737 | A * | 1/1996 | Meyer | A61J 1/2093 604/416 |
| 5,522,155 | A * | 6/1996 | Jones | A61J 1/065 34/286 |
| 9,435,586 | B2 * | 9/2016 | Ling | F26B 5/06 |
| 9,945,611 | B2 * | 4/2018 | DeMarco | F26B 5/065 |
| 11,047,620 | B2 * | 6/2021 | Beutler | F26B 21/003 |
| 11,054,185 | B1 * | 7/2021 | Trappler | F26B 25/185 |
| 11,320,200 | B1 * | 5/2022 | Yoshimoto | F26B 5/06 |
| 11,384,980 | B2 * | 7/2022 | Triglia, Jr. | F26B 13/008 |
| 11,399,537 | B2 * | 8/2022 | Xu | A01N 1/162 |
| 11,473,839 | B2 * | 10/2022 | Pachnatz | F26B 5/044 |
| 12,225,914 | B1 * | 2/2025 | Porter | F26B 25/063 |
| 2010/0044918 | A1 | 2/2010 | Lee et al. | |
| 2023/0168033 | A1 * | 6/2023 | Morikoshi | B01L 3/523 34/284 |

FOREIGN PATENT DOCUMENTS

| | | | | |
|---|---|---|---|---|
| CN | 212842500 | | 3/2021 | |
| EP | 3494349 | B1 * | 10/2020 | B65D 45/16 |
| JP | 2021-156457 | | 10/2021 | |
| JP | 6944991 | B2 * | 10/2021 | B65D 45/16 |
| JP | 2023079579 | A * | 6/2023 | B01L 3/523 |
| WO | WO-2017137637 | A2 * | 8/2017 | B65D 45/16 |

* cited by examiner

*Primary Examiner* — Stephen M Gravini

(57) ABSTRACT

A container of the present invention is for producing or housing a freeze-dried material. The container includes a bottom wall, a side wall, a support part for supporting a fluid to be freeze-dried in such a way that the fluid does not contact the bottom wall; and at least one vent disposed in the bottom wall or in at least a portion of the side wall located below the top of the support part.

7 Claims, 6 Drawing Sheets

CONTAINER, FLUID HANDLING DEVICE, AND FREEZE-DRYING METHOD

CROSS REFERENCE TO RELATED APPLICATIONS

This application claims the benefit of priority of Japanese Patent Application No. 2021-193100, filed on Nov. 29, 2021, the disclosure of which including the specification, drawings and abstract is incorporated herein by reference in its entirety.

TECHNICAL FIELD

The present invention relates to a container, a fluid handling device, and a freeze-drying method.

BACKGROUND ART

Typically, biological substances such as blood, proteins, and DNA are analyzed by performing processes such as mixing with reagents, heating, cooling, and detection. In recent years, microfluidic devices for sequentially performing such multiple processes have been known (see, for example, Patent Literature (hereinafter, referred to as PTL) 1).

PTL 1 describes processes for performing an analysis by reacting a sample with reagents in more than one reaction chamber in the microfluidic device.

A solid reagent placed in the reagent chamber is mixed with a sample diluent at the time of use to be prepared for an analysis.

CITATION LIST

Patent Literature

PTL 1
US Patent Application Publication No. 2010/0044918

SUMMARY OF INVENTION

Technical Problem

For using a freeze-dried material, which is prepared at the time of use as described above, in the microfluidic device, the freeze-dried material should be placed in the reagent chamber of the microfluidic device. However, freeze-dried materials are very fragile and difficult to handle. Placing such a freeze-dried material into a chamber is difficult in some cases. Instead of placing a freeze-dried material into a chamber, the following is also possible: placing a reagent in a container and freeze-drying the reagent to produce a freeze-dried material in the container, and placing the container with the freeze-dried material therein in the chamber.

However, when a freeze-dried material is produced in a container in this manner, the solvent (for example, water) may not satisfactorily sublimate, resulting in insufficient drying.

An object of the present invention is to provide a container for producing a freeze-dried material with promoted drying. Another object of the present invention is to provide a fluid handling device including the container. Another object of the present invention is to provide a freeze-drying method capable of promoting the drying.

Solution to Problem

A container of the present invention is for producing or housing a freeze-dried material. The container includes a bottom wall; a side wall; a support part for supporting a fluid, which is to be freeze-dried, in such a way that the fluid does not contact the bottom wall; and at least one vent disposed in the bottom wall or in at least a portion of the side wall, the portion being located below the top of the support part.

A fluid handling device of the present invention includes a container housing part for housing the container, and the container housed in the container housing part.

A freeze-drying method of the present invention includes providing a fluid into a container, which includes a bottom wall and a side wall, in such a way that the fluid does not contact the bottom wall; and removing a solvent from the fluid provided in the container to freeze-dry the fluid.

Advantageous Effects of Invention

The present invention can provide a container (cartridge) for producing or housing a freeze-dried material with promoted drying. The present invention can also provide a fluid handling device including the container. The present invention can further provide a freeze-drying method capable of promoting the drying.

DESCRIPTION OF EMBODIMENTS

Hereinafter, a fluid handling device according to the present embodiment will be described with reference to the attached drawings.

Configuration of Fluid Handling Device

Figure 1A:
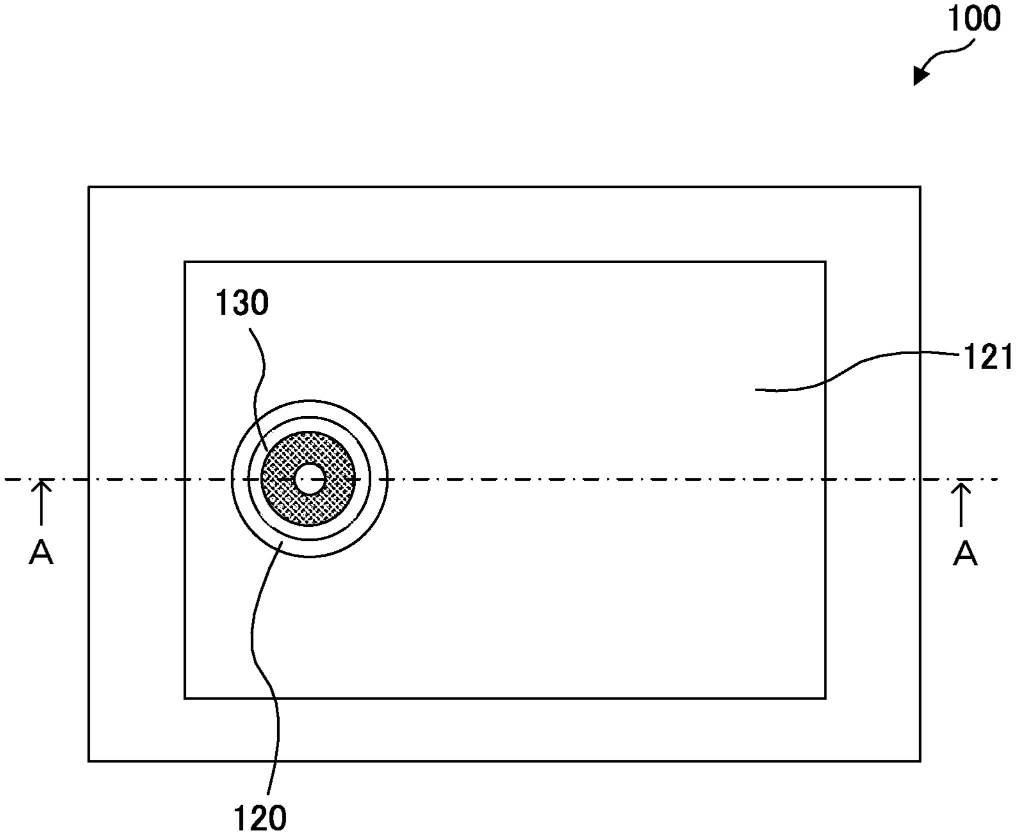
FIGS. 1A and 1B illustrate the configuration of a fluid handling device according to an embodiment.
Figure 1B:
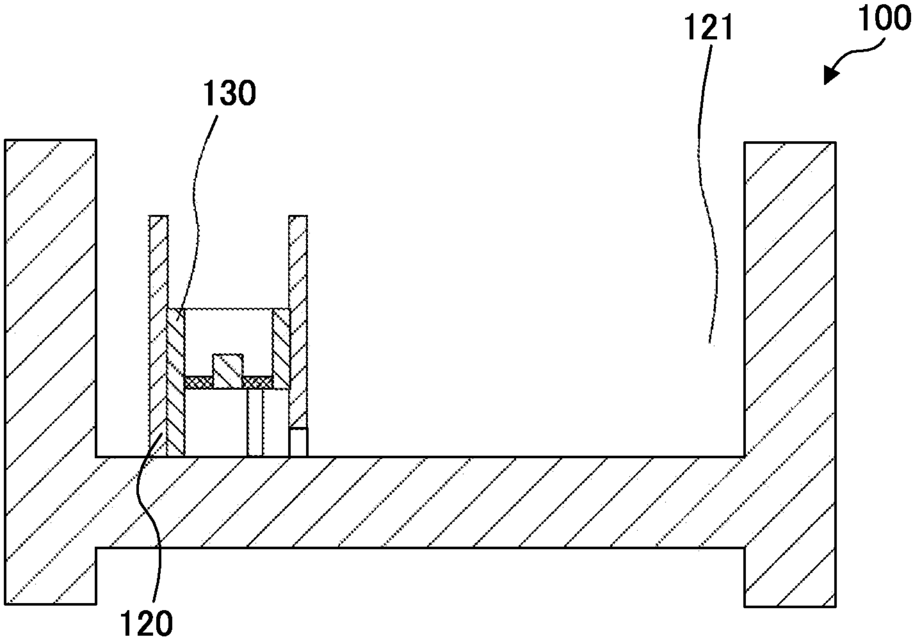

FIGS. 1A and 1B illustrate the configuration of fluid handling device 100. FIG. 1A is plan view of fluid handling device 100 and FIG. 1B is a cross-sectional view taken along line A-A of FIG. 1A.

Fluid handling device 100 includes container housing part 120 and container 130. In the present embodiment, fluid handling device 100 further includes a chamber. Container housing part 120 is disposed in chamber 121. An operation on a freeze-dried material, which is in container 130 housed in container housing part 120, takes place in fluid handling device 100. Container 130 is detachably attached to container housing part 120.

Fluid handling device 100 may have any configuration as long as the fluid handling device includes container housing part 120 and container 130, but a preferred configuration is such that the operation on a freeze-dried material can be easily carried out. In fluid handling device 100, an operation of dissolving a freeze-dried material is performed; therefore, fluid handling device 100 is preferably configured so as to facilitate the dissolution.

Chamber 121 is a compartment capable of containing liquid. Container housing part 120 is disposed in chamber 121.

The number of chambers 121 is not limited, and may be one or more than one. In the present embodiment, the number of chambers 121 is one. When the fluid handling device includes a plurality of chambers 121, it is possible not to dispose container housing part 120 in some of chambers 121. In addition, a reagent, a solvent for dissolving a freeze-dried material, or the like may be housed in chamber 121, which includes no container housing part 120 disposed therein.

The size and shape of chamber 121 are not limited. The size and shape of chamber 121 may be appropriately set according to the amount of fluid to be housed, the size of container housing part 120, or the like.

In the present embodiment, chamber 121 has a shape of a cuboid.

Container housing part 120 houses and holds container 130. Container housing part 120 preferably houses the container in such a way that the container is detachable. In the present embodiment, the inner diameter of container housing part 120 is slightly smaller than the outer diameter of container 130. This configuration allows container 130 to fit into container housing part 120, and container housing part 120 to house container 130 in a detachable manner. Container housing part 120 is fixed inside chamber 121.

Container housing part 120 may have any shape, which is set according to container 130. In the present embodiment, container housing part 120 has a shape of a cylindrical tube. A notch through which fluid can pass is provided in a lower portion of the cylindrical tube.

Figure 2A:
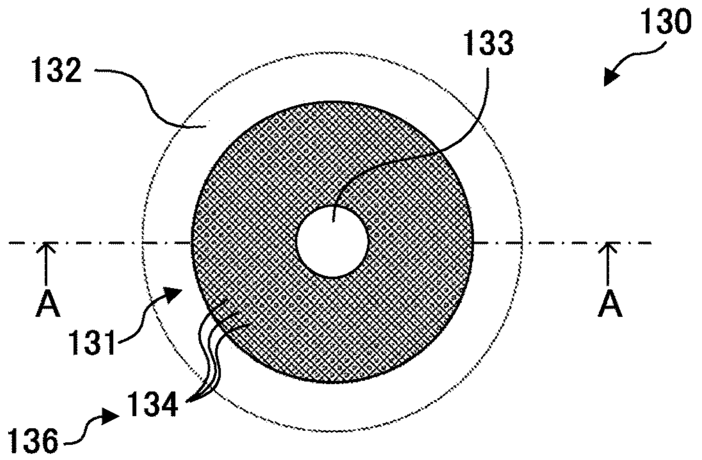
FIGS. 2A to 2C illustrate the configuration of a container.
Figure 2B:
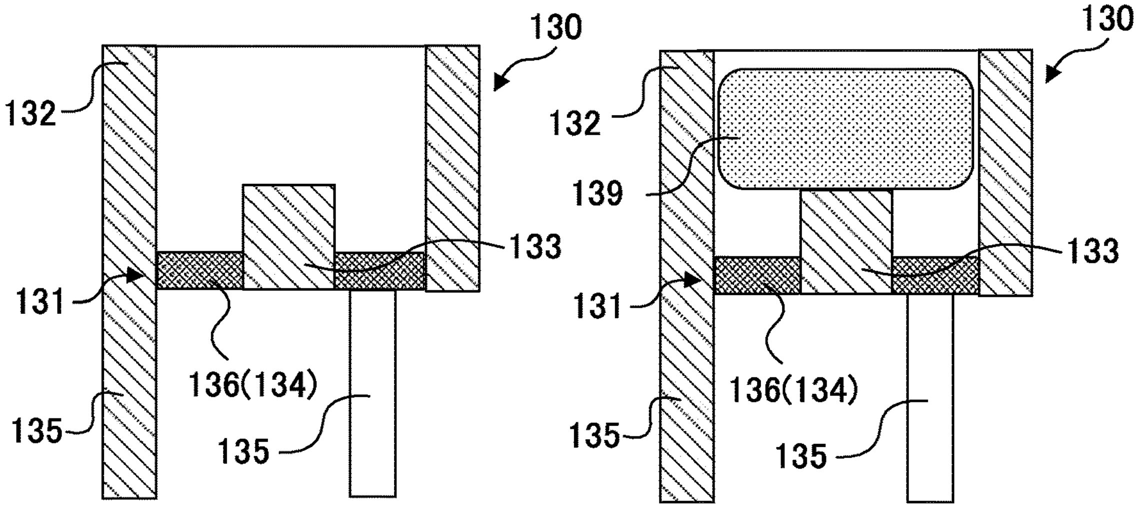
Figure 2C:
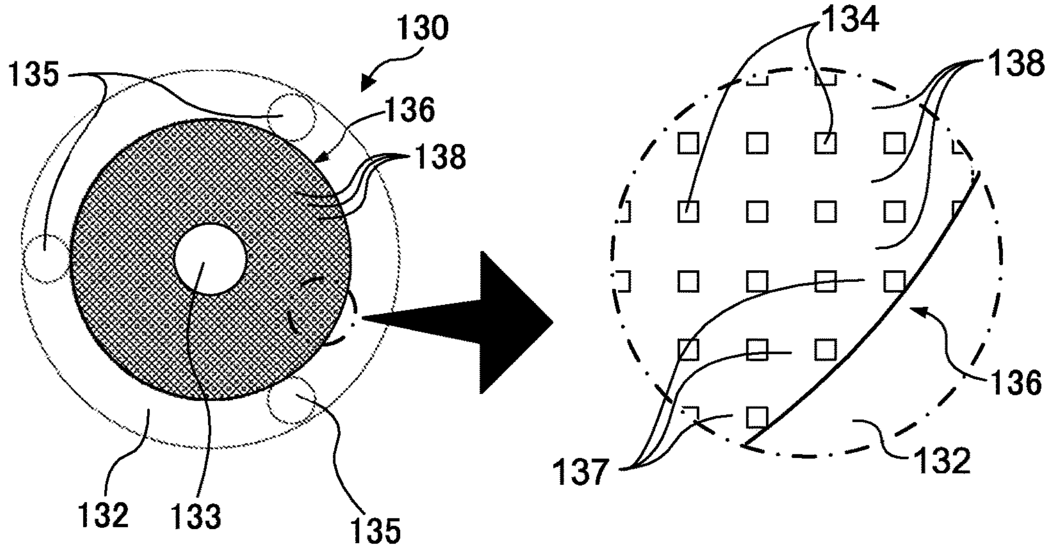

FIGS. 2A to 2C illustrate the configuration of container 130. FIG. 2A is a plan view of container 130, the left side diagram of FIG. 2B is a cross-sectional view taken along line A-A of FIG. 2A. The right side diagram of FIG. 2B illustrates a state of the container housing freeze-dried material 139. FIG. 2C is a bottom view of container 130 and a partial enlarged view of the region indicated by the dashed line. In FIGS. 2A and 2B and the left side diagram of FIG. 2C, mesh 136 formed by first ribs 137 and second ribs 138 is shaded.

As illustrated in FIGS. 2A to 2C, container 130 includes bottom wall 131, at least one side wall 132, at least one protrusion 133, and at least one vent 134. Container 130 may include at least one leg 135. Container 130 is configured to contain or produce a freeze-dried material. Container 130 may be used to produce a freeze-dried material and contain the freeze-dried material as it is. Container 130 is detachably housed in container housing part 120.

Bottom wall 131 forms the bottom of container 130. In the present embodiment, bottom wall 131 includes mesh 136, which includes at least one vent 134.

Vent 134 may be disposed in at least a portion of bottom wall 131 or in at least a portion—located below the top of protrusion 133—of side wall 132. At least one vent 134 is in the container.

When container 130 is used for producing a freeze-dried material, vent 134 functions as a hole through which gas having sublimated from a frozen fluid passes. When container 130 is used for housing a freeze-dried material, and a fluid (solvent) is supplied from below vent 134, vent 134 functions as a hole through which the fluid enters container 130. When container 130 is used for housing a freeze-dried material, and a fluid (solvent) is supplied from above the freeze-dried material, vent 134 functions as a hole through which the solution (reagent) of the freeze-dried material is discharged to the outside of container 130.

Vent 134 may have any configuration as long as the above functions can be obtained. Vent 134 may be formed by mesh 136 or may be formed by slits. A semipermeable membrane may be placed at the vent as long as gas can pass therethrough. In the present embodiment, vent 134 is formed by a mesh. In addition, mesh 136 is formed in bottom wall 131.

The material of mesh 136 may be resin such as polypropylene (PP), polyacetal (POM), or polyamide (PA), or metal such as stainless steel, titanium, or aluminum. Mesh 136 may also be a nonwoven fabric, paper, or cloth. In the present embodiment, mesh 136 is made of resin and integrally formed by injection molding.

Mesh 136 is formed of a plurality of ribs (a plurality of first ribs 137 and a plurality of second ribs 138). The plurality of first ribs 137 each extend in a first direction, and the plurality of second ribs 138 each extend in a second direction perpendicular to the first direction. This configuration forms a plurality of vents 134 in regions between first ribs 137 and between second ribs 138 in plan view.

Mesh 136 may have any shape in plan view. In the present embodiment, the shape of mesh 136 in plan view is circular. The plurality of vents 134 in mesh 136 may have any shape in plan view. The shape of vent 134 in plan view may be circular or polygonal. In the present embodiment, the plurality of first ribs 137 and the plurality of second ribs 138 form the plurality of vents 134 that are square in plan view. The length of one side of vent 134 is appropriately set according to the viscosity of a reagent in a liquid form, the type of the reagent, and the like. The length of one side of vent 134 (opening of mesh 136) is preferably within the range of 0.1 μm to 500 μm, more preferably within the range of 0.2 to 300 μm. Mesh 136 with vents 134 (opening of mesh 136) whose side has a length within the above range is easier to be produced by injection molding.

Protrusion 133 protrudes from bottom wall 131. When container 130 is used for producing a freeze-dried material, protrusion 133 supports a fluid to be freeze-dried in such a way that the fluid does not contact bottom wall 131. The fluid is considered to be supported by protrusion 133 due to surface tension. As protrusion 133 supports the fluid, the area where the gas can sublimate from a lower portion of the frozen fluid increases, thereby promoting the freeze-drying. Gas having sublimated from the lower portion of the frozen fluid is discharged to the outside of container 130 through at least one vent 134 disposed in at least a portion of the bottom wall or in at least a portion—located below the top of the protrusion—of the side wall.

As a freeze-dried material is produced as described above, the freeze-dried material is usually housed in container 130 while being supported by protrusion 133 as illustrated in right side diagram of FIG. 2B.

Protrusion 133 may have any shape as long as the protrusion can support the fluid in such a way that the fluid does not contact bottom wall 131. Examples of the shape of protrusion 133 include shapes of columns, cylindrical tubes, and plates. In the present embodiment, protrusion 133 has a shape of a column.

The top of protrusion 133 may have any shape in plan view as long as the above functions can be obtained. Examples of the shape of the top of protrusion 133 in plan view include shapes of circles, crosses, rectangles, and polygons. In the present embodiment, the top of protrusion 133 has a shape of a circle in plan view.

The top of protrusion 133 may have any size in plan view as long as the above functions can be obtained. The area of the top of protrusion 133 in plan view is preferably, for example, within a range of approximately 0.07 $mm^2$ to 0.80 $mm^2$. In the present embodiment, the top of the protrusion has a shape of a circle whose diameter is 0.5 mm.

The number of protrusions 133 is not limited as long as the above functions can be obtained. The number of protrusions 133 may be one, two, or three. In the present embodiment, the number of protrusion 133 is one.

Side wall 132 is disposed so as to surround bottom wall 131 and defines the outer shape of container 130. While a fluid to be freeze-dried is supported by protrusion 133, the inner surface of side wall 132 may contact the fluid.

When side wall 132 contacts the fluid, side wall 132 together with protrusions 133 described above contributes to supporting the fluid to be freeze-dried in such a way that the fluid does not contact bottom wall 131. From this viewpoint, the space defined by the inner surface of side wall 132 preferably has a shape in such a way that the space easily supports the fluid. In the present embodiment, the defined shape is circular in plan view in FIG. 2A.

The area of the space defined by the inner surface of side wall 132 in plan view is preferably within the range of approximately 8.0 $mm^2$ to 16.0 $mm^2$.

Legs 135 are disposed at the bottom of the container. Legs 135 place container 130 at an increased position and create a space between the bottom of container 130 and the bottom of container housing part 120. This created space is also a portion for receiving a fluid (solvent) provided into container housing part 120 or a solution (reagent) of a freeze-dried material. For supplying a fluid from below vent 134, the fluid first fills the space and then enters container 130 through vent 134. When a fluid is supplied from above a freeze-dried material, the solution of the freeze-dried material enters the space through vent 134.

The shape, number, and other features of legs 135 are not limited as long as the above functions can be obtained. In the present embodiment, the length of leg 135 is set in such a way that the bottom of container 130 is disposed close to the bottom of container housing part 120, as illustrated in FIG. 1B. In the present embodiment, the number of legs 135 is three.

Preparation Method at the Time of Use

Figure 3A:
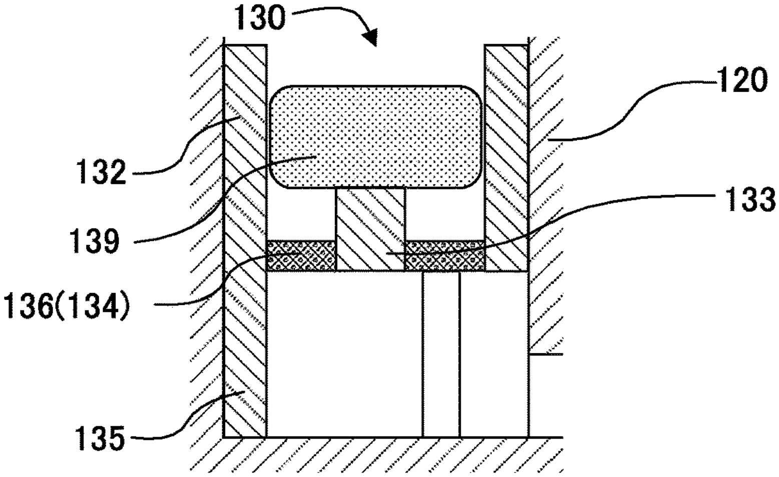
FIGS. 3A to 3C are diagrams for explaining a method of dissolving a freeze-dried material.
Figure 3B:
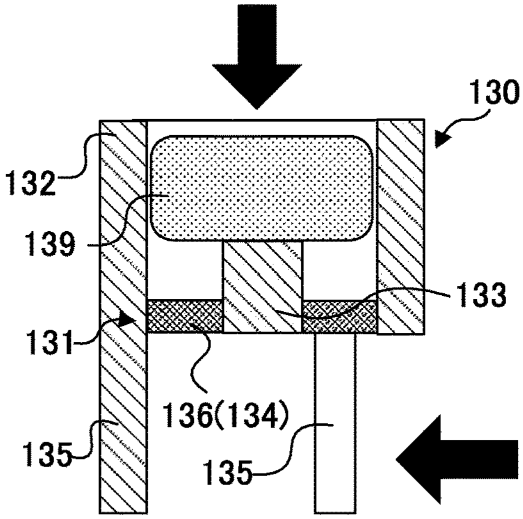
Figure 3C:
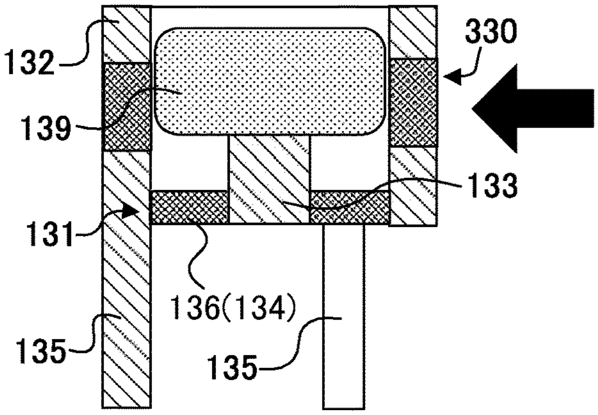

In the following, a method for preparing a reagent at the time of use (method for dissolving freeze-dried material 139) will be described. FIGS. 3A to 3C are diagrams for explaining a method of dissolving freeze-dried material 139.

As illustrated in FIG. 3A, container 130 housing freeze-dried material 139 is prepared. Container 130 is housed in container housing part 120 of fluid handling device 100.

A solvent is then supplied to container 130. Any method capable of supplying a solvent to container 130 may be used for the supplying. In addition, the direction in which the solvent is supplied is not limited and can be selected as appropriate. The solvent may be supplied from the upper portion of container 130 or from the lower portion of container 130, as indicated by the arrows in FIG. 3B. Specifically, the solvent may be supplied from the upper portion of container 130 with a pipette or the like, or may be supplied with syringe or the like inserted into a through hole (notch) disposed in the lower portion of container housing part 120. Alternatively, when the container includes mesh 136 (vents 134) in side wall 132 as container 330 in a variation described below, the solvent may be supplied from the side of container 330, such as through mesh 136 (vents 134) (see FIG. 3C). Freeze-dried material 139 dissolves in the solvent contacting the freeze-dried material, thereby obtaining a reagent.

The obtained reagent is then taken out. Any method may be used to take out the reagent. For example, the reagent may be taken out from the upper portion of container 130 with a pipette or the like, or the reagent may be taken out with a syringe inserted into the through hole.

Variations

FIGS. 4A to 5C illustrate containers according to variations 1 to 6, respectively. In each of FIGS. 4A to 5C, the left side diagram illustrates the state of a container without freeze-dried material 139, and the right side diagram illustrates the state of the container housing freeze-dried material 139. In the following, the containers according to variations 1 to 6 will be described. In the containers according to variations 1 to 6, the same configurations as those of the container according to the above embodiment are denoted by the same reference numerals, and the description thereof is omitted.

Variation 1

Figure 4A:
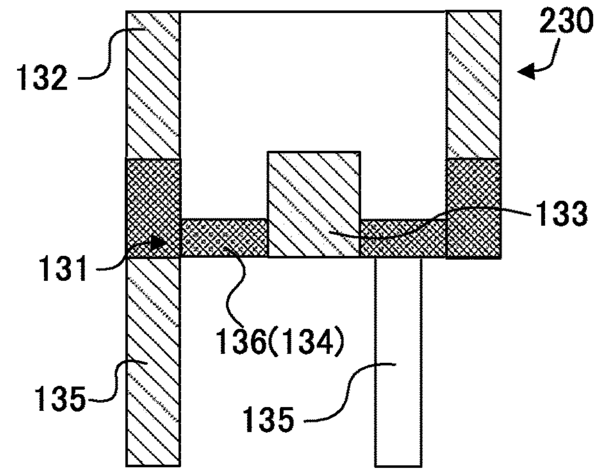
FIGS. 4A to 4C illustrate containers according to variations 1 to 3.

FIG. 4A illustrates container 230 according to variation 1. Container 230 differs from container 130 according to the above embodiment in that mesh 136 (vents 134) of container 230 is disposed not only in bottom wall 131 but also in side wall 132 in a portion located below the top of protrusion 133.

Variation 2

Figure 4B:
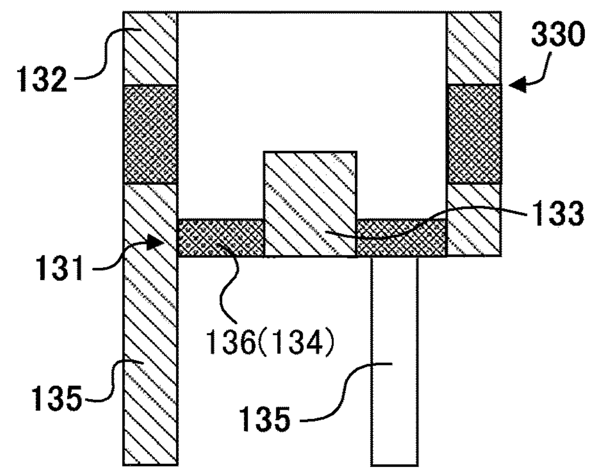

FIG. 4B illustrates container 330 according to variation 2. In container 330, mesh 136 (vents 134) is disposed not only in bottom wall 131 but also in side wall 132, in the same manner as in container 230. However, mesh 136 (vents 134) of container 330 is disposed in a portion located above as well as below the top of protrusion 133.

Variation 3

Figure 4C:
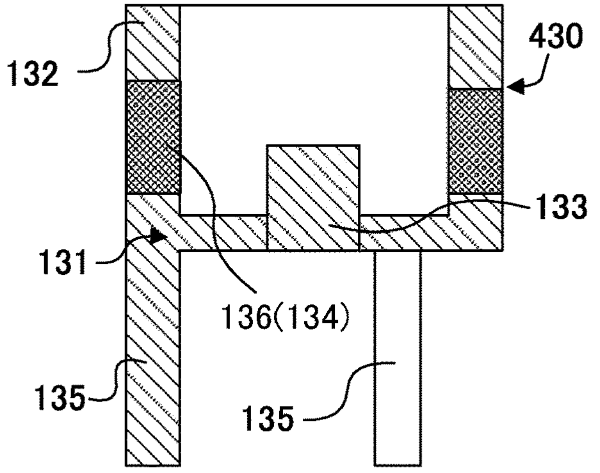

FIG. 4C illustrates container 430 according to variation 3. Container 430 differs from the containers according to the above embodiment and variations 1 and 2 in that mesh 136 (vents 134) of container 430 is disposed only in side wall 132, and the mesh 136 (vents 134) has a portion located below the top of protrusion 133.

Variation 4

Figure 5A:
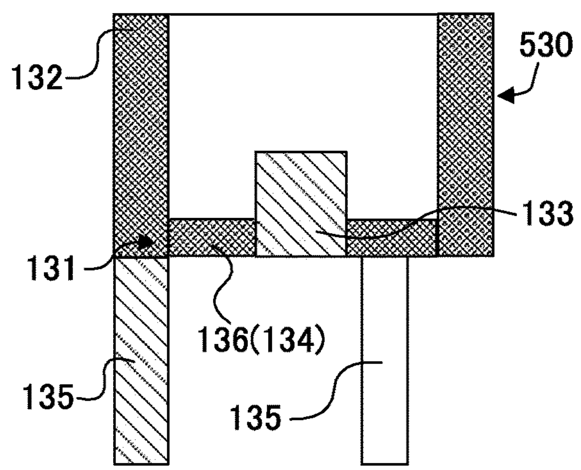
FIGS. 5A to 5C illustrate containers according to variations 4 to 6.

FIG. 5A illustrates container 530 according to variation 4. Container 530 differs from the containers according to the above embodiment and variations 1 to 3 in that mesh 136 (vents 134) of container 530 is disposed over the entire bottom wall 131 and side wall 132.

Variation 5

Figure 5B:
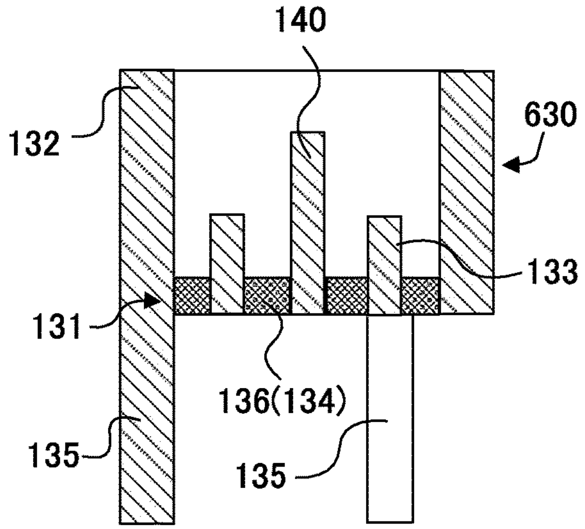

FIG. 5B illustrates container 630 according to variation 5. Container 630 differs from the other containers described above in that container 630 includes a plurality of (two) protrusions 133. In addition, container 630 differs from the other containers in that container 630 includes holding protrusion 140 for holding freeze-dried material 139. Holding protrusion 140 protrudes from bottom wall 131.

Holding projection 140 is configured to hold freeze-dried material 139. Holding protrusion 140 has a tip inserted into freeze-dried material 139, thereby holding freeze-dried material 139.

For example, holding protrusion 140 holding freeze-dried material 139 can prevent the floating of the freeze-dried material on the surface of a solvent when the freeze-dried material is dissolved in the solvent, thereby promoting the dissolution. The size, location, shape, and other features of holding protrusion 140 are not limited as long as the holding protrusion can hold freeze-dried material 139. When protrusion 133 protrudes from bottom wall 131, holding protrusion 140 is preferably longer than protrusion 133. For holding freeze-dried material 139 without fail, holding protrusion 140 preferably has an inverse tapered shape such that the outer shape of the protrusion becomes larger and thicker as the distance from bottom wall 131 increases.

Variation 6

Figure 5C:
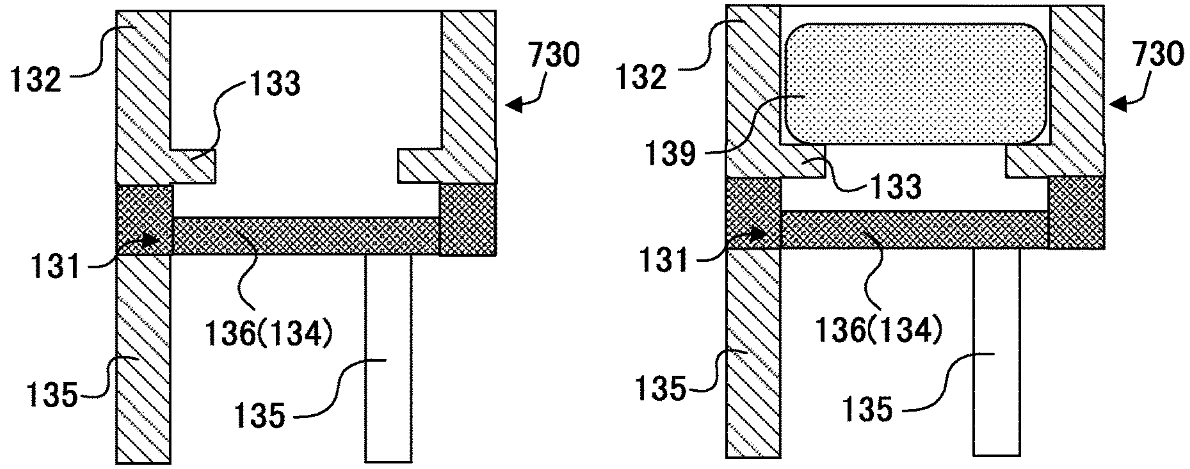

FIG. 5C illustrates container 730 according to variation 6. Container 730 differs from the other containers described above in that container 730 includes at least one protrusion 133 protruding from side wall 132. Protrusion 133 protruding from side wall 132 is also configured to support a fluid in such a way that the fluid does not contact bottom wall 131, in the same manner as above-described protrusion 133 protruding from bottom wall 131.

Protrusion 133 protruding from side wall 132 may have any configuration as long as the protrusion can support a fluid in such a way that the fluid does not contact bottom wall 131. In the present embodiment, two (a pair of) protrusions 133 protrude from side wall 132, and are disposed so as to face each other with the center of bottom wall 131 therebetween in plan view.

Other Variations

The above embodiment and variations 1 to 6 describe containers each having a structure (for example, protrusion 133) as a support part for supporting a fluid. However, any container that does not include a structure as a support part may be used in the present invention as long as the container can support the fluid in such a way that the fluid does not contact bottom wall 131. For example, containers of the present invention include the following: a container including side wall 132 as a supporting part whose contact surface with fluid has appropriately adjusted roughness and wettability in such a way that the side wall can support a fluid and the fluid does not contact bottom wall 131.

Method for Producing Freeze-Dried Material

In the following, a method for producing a freeze-dried material will be described.

A fluid is provided into a container in such a way that the fluid does not contact bottom wall 131. As a method of supplying the fluid in this manner, using the container according to the above embodiment or the variation is possible. Specifically, for example, the fluid may be supplied so as to be supported by protrusion(s) 133 protruding from bottom wall 131 or side wall 132 of the container.

Solvent (for example, water) is then removed from the upper and lower portions of the fluid supplied in the container to freeze-dry the fluid. Specifically, after the fluid is frozen, the solvent is removed by vacuum. The solvent is removed by sublimation.

During the removal of the solvent, the frozen fluid does not contact bottom wall 131 and thus the sublimation from the lower portion is more likely to occur. Gas having sublimated from the lower portion of the frozen fluid is discharged from at least one vent 134 disposed in at least a portion of bottom wall 131 or in at least a portion—located below the top of protrusion 133—of side wall 132. As a result, the drying is promoted.

A specific example of the method for producing a freeze-dried material will be described with the use of the container according to the above-descried other variations as an example.

Figure 6A:
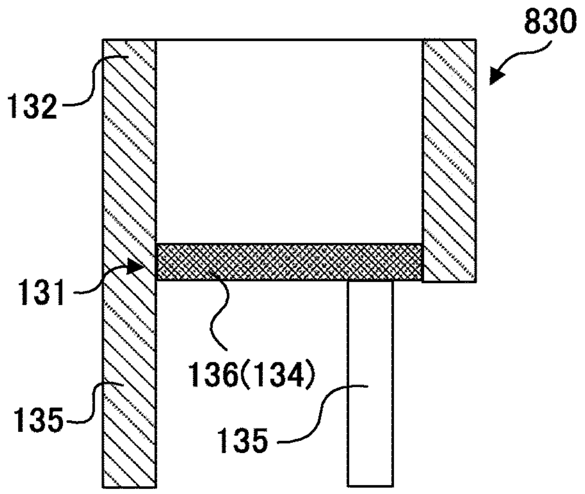
FIGS. 6A to 6C illustrate a specific example of a method for producing a freeze-dried material.
Figure 6B:
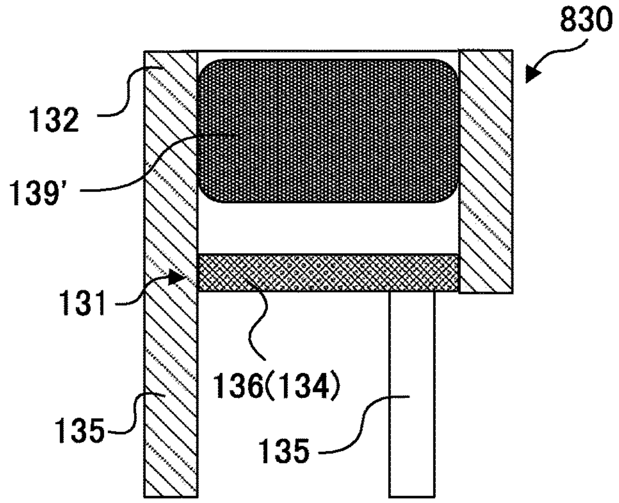
Figure 6C:
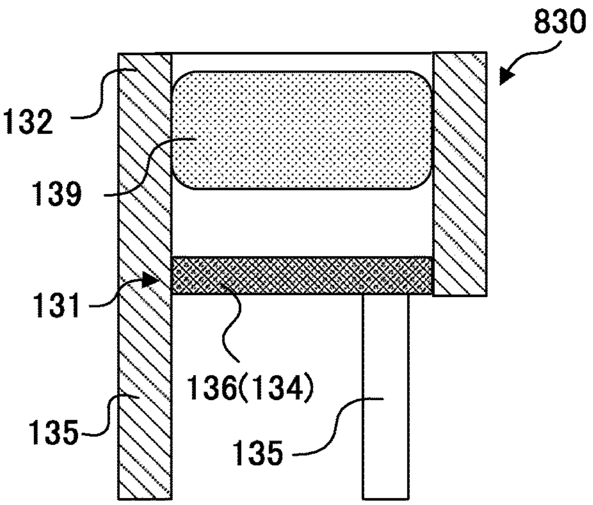

FIGS. 6A to 6C illustrate how a freeze-dried material is produced by using container 830 according to the above-descried other variations.

As illustrated in FIG. 6A, container 830 is prepared. As clear from FIG. 6A, container 830 does not include a structure (for example, protrusion 133) as a support part.

As illustrated in FIG. 6B, fluid 139' to be freeze-dried is then placed in container 830. In side wall 132 of container 830, the roughness and wettability of the contact surface with fluid 139' are adjusted, thus the side wall can support fluid 139' in such a way that the fluid does not contact bottom wall 131.

Fluid 139' is then freeze-dried. The sublimated gas is discharged mainly from the upper portion of container 830 and vents 134. In this manner, a container housing freeze-dried material 139 can be obtained as illustrated in FIG. 6C.

Effects

The present invention can provide a container in which drying can be promoted, a fluid handling device including the container, and a freeze-drying method.

INDUSTRIAL APPLICABILITY

The container, fluid handling device, and freeze-drying method of the present invention can be applied, for example, to the analysis of trace amounts of biological samples.

REFERENCE SIGNS LIST

100 Fluid handling device
120 Container housing part
121 Chamber
130, 230, 330, 430, 530, 630, 730, 830 Container
131 Bottom wall
132 Side wall
133 Protrusion
134 Vent
135 Leg
136 Mesh
137 First rib
138 Second rib
139 Freeze-dried material
139' Fluid
140 Holding protrusion

The invention claimed is:

1. A container for producing or housing a freeze-dried material, the container comprising:

a bottom wall;

a side wall;

a support part for supporting a fluid in such a way that the fluid does not contact the bottom wall and that area from which gas can be generated by sublimation from a lower portion of a frozen fluid is increased to promote freeze-drying, the fluid being a fluid to be freeze-dried; and at least one vent disposed in the bottom wall or in at least one portion of the side wall, the portion being located below a top of the support part, wherein the container is configured to directly contain the fluid or the freeze-dried material, and wherein an area of a space defined by inner surface of the side wall in plan view is within a range of 8.0 $mm^2$ to 16 $mm^2$.

2. The container according to claim 1, wherein the support part is a protrusion protruding from the bottom wall or the side wall.

3. The container according to claim 1, wherein the bottom wall or the at least one portion of the side wall includes a mesh including the at least one vent.

4. The container according to claim 1, further comprising the freeze-dried material supported by the support part.

5. A fluid handling device, comprising:

a container housing part; and the container according to claim 1 housed in the container housing part, wherein the container housing part is configured to house the container.

6. A freeze-drying method, comprising:

providing a fluid into a container including a bottom wall and a side wall, the providing being performed in such a way that the fluid does not contact the bottom wall and that area from which gas can be generated by sublimation from a lower portion of a frozen fluid is increased to promote freeze-drying; and removing a solvent from the fluid provided in the container to freeze-dry the fluid, wherein the container directly contains the fluid, and wherein an area of a space defined by inner surface of the side wall in plan view is within a range of 8.0 $mm^2$ to 16.0 $mm^2$.

7. The freeze-drying method according to claim 6, wherein, in the providing, the fluid is supported by a protrusion protruding from the bottom wall or the side wall of the container.

* * * * *